US010960325B1

(12) United States Patent
Coons et al.

(10) Patent No.: US 10,960,325 B1
(45) Date of Patent: Mar. 30, 2021

(54) ULTRA LOW POWER ACOUSTIC SEPARATION

(71) Applicants: Los Alamos National Security, LLC, Los Alamos, NM (US); SonoSep Technologies Inc., Vancouver (CA)

(72) Inventors: James E. Coons, Los Alamos, NM (US); Felix Trampler, Hinterbruehl (AT); Benjamin H. J. Yap, Emeryville, CA (US)

(73) Assignees: Triad National Security, LLC, Los Alamos, NM (US); SonoSep Technologies Inc., Vancouver (CA)

( * ) Notice: Subject to any disclaimer, the term of this patent is extended or adjusted under 35 U.S.C. 154(b) by 313 days.

(21) Appl. No.: 16/011,496

(22) Filed: Jun. 18, 2018

Related U.S. Application Data

(60) Provisional application No. 62/521,149, filed on Jun. 16, 2017.

(51) Int. Cl.
  *C02F 1/36* (2006.01)
  *B01D 21/28* (2006.01)
  *B01J 19/10* (2006.01)
(52) U.S. Cl.
  CPC ............ *B01D 21/283* (2013.01); *B01J 19/10* (2013.01); *C02F 1/36* (2013.01)

(58) Field of Classification Search
  CPC .. C12N 13/00; C12N 1/12; C02F 1/36; B01D 21/28; H01L 41/187; C12M 1/34; C12M 1/36; C12M 1/00; H03H 9/17; H03H 9/13
  See application file for complete search history.

(56) References Cited

U.S. PATENT DOCUMENTS

| 5,626,767 | A | 5/1997 | Trampler et al. |
| 7,766,121 | B2 | 8/2010 | Hadfield et al. |
| 10,052,431 | B2 * | 8/2018 | Dreschel ........... B01L 3/502761 |
| 10,428,324 | B1 * | 10/2019 | Coons .................... C12N 13/00 |

OTHER PUBLICATIONS

"Acoustic Manipulation of Fluids Based on Eigenfrequency," U.S. Appl. No. 15/400,890, filed Jan. 6, 2017, 44 pages.
"User Manual, BioSep APS 990, 10-50 L/day," AppliSens Sensor Innovation, 43 pages (Jan. 2004).

* cited by examiner

*Primary Examiner* — Cameron J Allen
(74) *Attorney, Agent, or Firm* — Klarquist Sparkman, LLP

(57) ABSTRACT

Energy-efficient separation of particulates from fluids is based on determining particulate mass removal as a function of applied energy. Energy-efficient ultrasonic field powers and exposure durations are applied to a particulate containing fluid, and particles removed. In some cases, ultrasonic exposures are selected that provide the maximum particulate removal per applied energy.

21 Claims, 8 Drawing Sheets

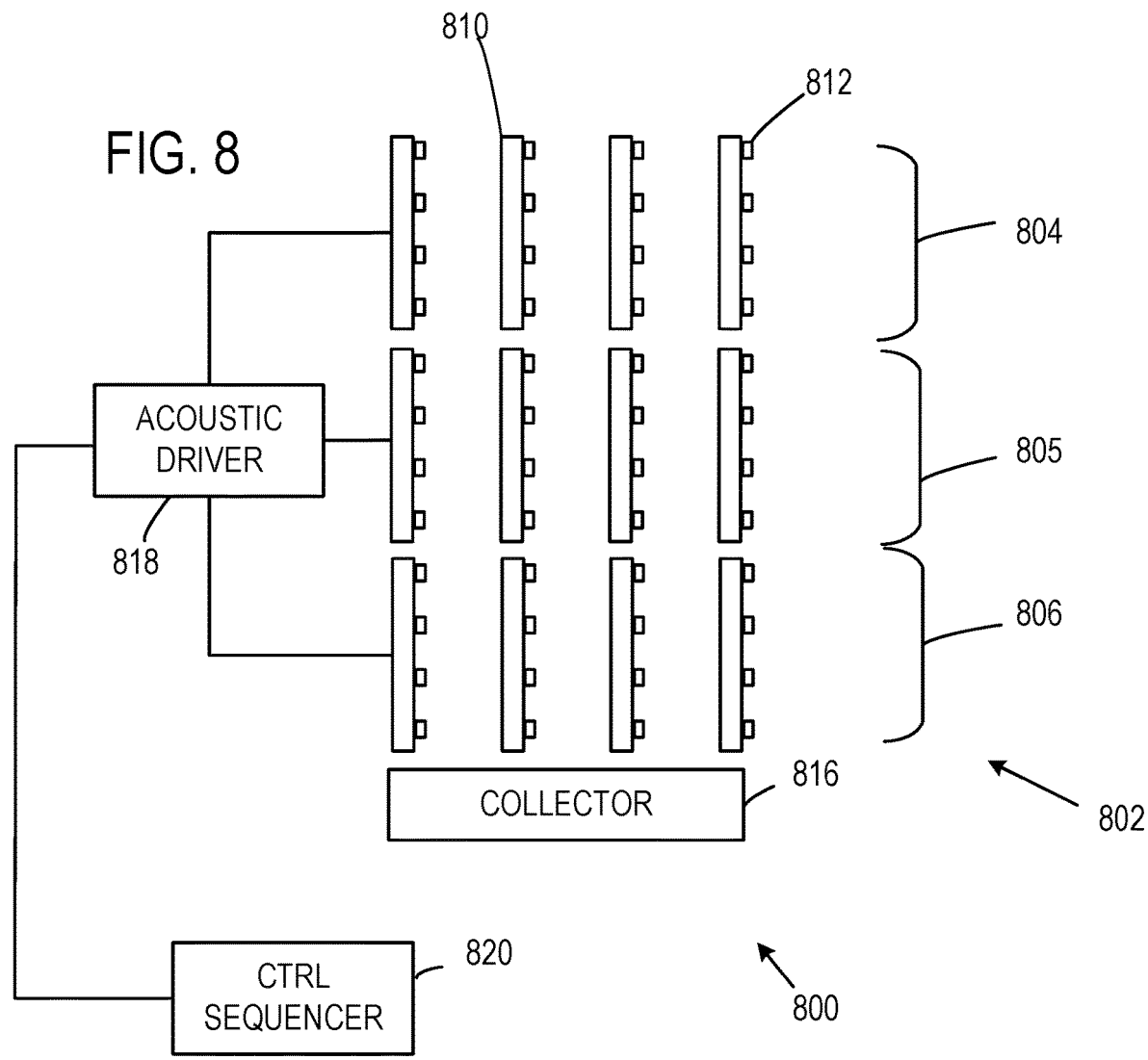

ULTRA LOW POWER ACOUSTIC SEPARATION

CROSS-REFERENCE TO RELATED APPLICATIONS

This application claims the benefit of U.S. Provisional Application 62/521,149, filed Jun. 16, 2017, which is incorporated herein by reference.

ACKNOWLEDGMENT OF GOVERNMENT SUPPORT

This invention was made with government support under Contract No. DE-AC52-06NA25396 awarded by the U.S. Department of Energy. The government has certain rights in the invention.

FIELD

The disclosure pertains to ultrasonic separation.

BACKGROUND

Particulate matter in fluids can be removed using ultrasonic separators in which particles aggregate in response to an ultrasonic field. Ultrasonic separators typically include a separation vessel which forms part of an ultrasonic resonator and are typically operated so as to maintain ultrasonic field strength without consideration of energy input. Large amplitude ultrasonic fields applied for long durations can remove a substantial portion of the particulates in a fluid. In many applications, these approaches consume more energy than is necessary, and lower energy approaches to ultrasonic separation are needed. One possible approach is described in U.S. patent application Ser. No. 15/400,890, filed Jan. 6, 2017, and which is incorporated herein by reference. Other arrangements of acoustic transducers are described in U.S. Pat. Nos. 7,766,121 and 5,626,767, both of which are incorporated herein by reference. However, further improvements remain desirable.

SUMMARY

In some examples, ultrasonic separation methods comprise measuring at least a reference portion containing particulates in a fluid to determine an energy-efficient ultrasonic exposure for use in separation of particulates from the fluid. A sample portion containing particulates in a fluid is processed according to the energy-efficient ultrasonic exposure as to separate a portion of particulates from the fluid. According to representative examples, methods comprise selecting an ultrasonic exposure duration, and based on the selected ultrasonic exposure duration and the energy-efficient exposure, selecting an ultrasonic power. The sample portion containing particulates in the fluid is processed according to the energy-efficient ultrasonic exposure by applying the selected ultrasonic power for the selected ultrasonic exposure duration. In typical implementations, selecting the ultrasonic power corresponds to selecting an electrical drive power to an ultrasonic transducer. In further examples, selecting the ultrasonic power corresponds to selecting an electrical drive voltage and the selected ultrasonic power is applied based on driving an acoustic transducer with the selected electrical drive voltage.

In some embodiments, the energy-efficient exposure is determined based on a change in a rate of particulate mass removal as a function of exposure, such as a decrease in a rate of change of particulate mass removal as a function of exposure. In some examples, the decrease of a rate of change of particulate mass removal as a function of exposure is at least 20% of a maximum rate of change. In one example, the energy-efficient exposure is selected from an energy-efficient range associated with an estimated minimum energy per unit mass for particulate removal. In still further examples, the energy-efficient range is defined by exposures within ±10% of a minimum energy exposure.

According to some embodiments, the measuring a reference portion containing particulates in the fluid to determine the energy-efficient ultrasonic exposure comprises exposing the reference sample to an ultrasonic field at a selected ultrasonic power and measuring particulate separations at a plurality of times during the exposing. The energy-efficient ultrasonic exposure is selected based on the measured particulate separations and the plurality of times. Typically, the reference portion and the sample portion are obtained from a common sample.

Separation apparatus comprise a sample container and an ultrasonic generator situated to couple an ultrasonic field having a selected power to the sample container for a selected duration. An ultrasonic generator controller is coupled to the ultrasonic generator so as to establish the selected power and the selected duration to provide an energy-efficient exposure to a particulate containing fluid situated in the sample container, and remove particulates from the fluid in the sample container. In some implementations, a memory device stores at least one energy-efficient exposure range or energy-efficient exposure associated with particulate removal from the fluid. In other examples, the ultrasonic generator and the sample container are configured to define an ultrasonic resonator so as to increase an ultrasonic field amplitude in the sample container.

In some embodiments, the ultrasonic separators include a turbidity sensor coupled to the sample container and the ultrasonic generator controller. The turbidity sensor is situated to determine a particulate concentration in a sample in the sample container. The ultrasonic generator controller is coupled to adjust at least one of an RF drive power, a flow rate, or an exposure time based on at least one indicator of particulate concentration. According to other examples, the ultrasonic generator controller is coupled to adjust at least one of an RF drive power, a flow rate, or an exposure time based on a rate of change of particulate concentration. In a particular example, the ultrasonic generator controller is coupled to halt exposure based on a change in rate of change of a particulate concentration and the particulate concentration is in mass per volume.

The foregoing and other objects, features, and advantages of the disclosure will become more apparent from the following detailed description, which proceeds with reference to the accompanying figures.

BRIEF DESCRIPTION OF THE DRAWINGS

FIG. 8 illustrates a representative ultrasonic separation system that includes a plurality of stacked sets of parallel acoustic panels.

DETAILED DESCRIPTION

Figure 1:
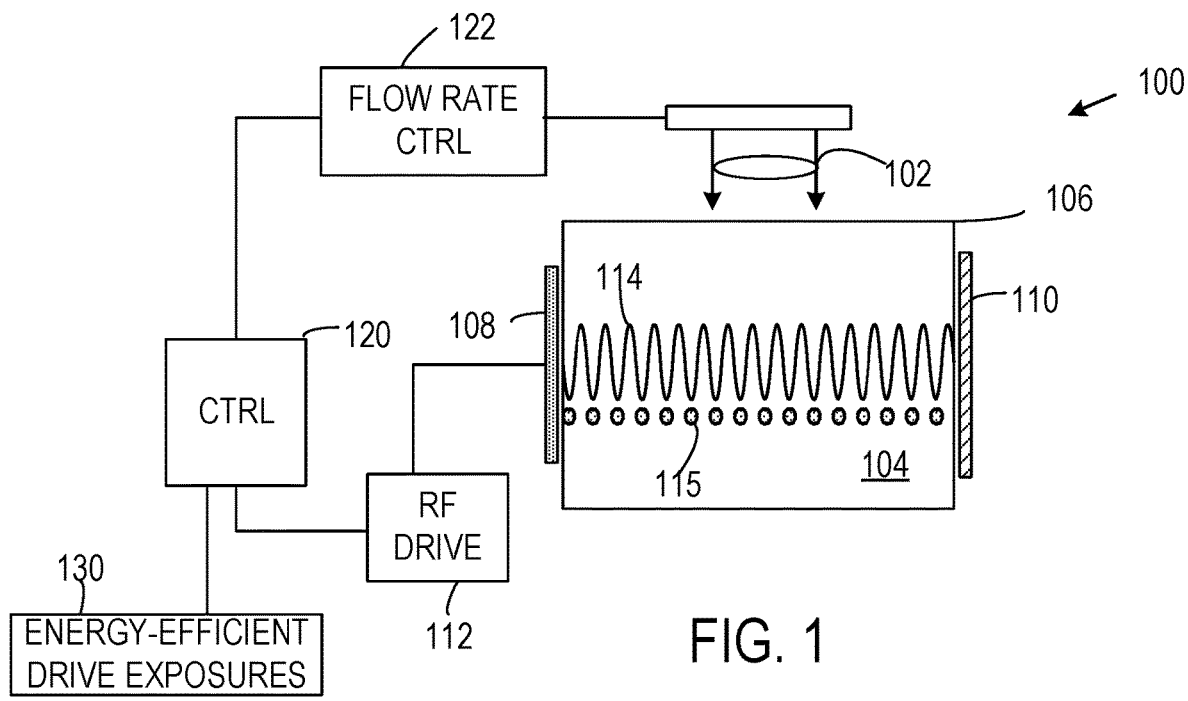
FIG. 1 illustrates a representative ultrasonic separator configured to operate so as to reduce energy consumption per unit mass of separated particulate.

Disclosed herein are methods and apparatus that can provide removal of particulates from fluids with low applied energy per unit mass ratios. Standing acoustic waves and the associated nodes induce particle migration. Such migration results in the accumulation of particles so the particles flocculate or aggregate and settle out of a fluid. In some examples, an optimum energy per unit mass is used, with or without flow of the particulate containing fluid. Ultrasonic separators of various types can be adapted as disclosed herein. Some examples of resonator based separators are shown in Trampler et al., U.S. Pat. No. 5,626,767, which is incorporated herein by reference. Samples can be batch-processed (i.e., without flow) or processed with flow. In one example, microalgae are separated from a water-based medium using energies of about 0.3 kWh/kg. Specific energies/unit mass generally depend on properties of the particulates to be separated, particulate concentration, fluid, and flow rate. Flow rate is generally controlled to minimize loss of particles from the acoustic field.

In some methods, applied energies are determined based on interrogation of a sample to obtain suitable energy values derived from measurements. Alternatively, a particulate concentration can be estimated using a feedback from a fluid monitoring device such as a turbidity meter.

As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items.

The systems, apparatus, and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

In some examples, values, procedures, or apparatus' are referred to as "lowest", "best", "minimum," or the like. It will be appreciated that such descriptions are intended to indicate that a selection among many used functional alternatives can be made, and such selections need not be better, smaller, or otherwise preferable to all other selections. Examples are described with reference to directions indicated as "above," "below," "upper," "lower," and the like. These terms are used for convenient description, but do not imply any particular spatial orientation.

Acoustic waves or ultrasonic waves as used herein refers to pressure waves in a fluid of interest. Such waves are typically produced using a transducer such as a piezoelectric or other transducer that is electrically coupled to be driven by a sinusoidal or other temporally varying electrical voltage or current. Electrical power, voltage, or current amplitudes applied to an ultrasonic transducer typically correspond to acoustic wave amplitudes that are generated. Acoustic wave amplitude (or acoustic wave power) is typically selected based on selection of an electrical drive signal, and acoustic wave amplitudes/powers are not measured. For many applications, a total ultrasonic energy (a product of power and exposure duration) used to separate a unit mass of a particulate from a solution is an important metric. This total energy is referred to herein as "exposure." In the following discussion, such energies/mass are based on total applied energy and can include energy that heats a transducer or otherwise does not contributed to acoustic wave power. Acoustic energy/mass could also be used, but in most cases, acoustic energy is not measured, but is inferred from electrical drive signals. Acoustic power is assumed to correspond to applied electrical power, and is therefore proportional to a square of an applied voltage or current, with suitable time averaging based on the associated electrical drive waveform.

The examples are generally described with reference to ultrasonic fields that form standing waves in an acoustic resonator, but other applied ultrasonic fields can be used and energy-efficient operation determined for any particular ultrasonic field arrangement. Low energy ultrasonic separation can use efficient separator vessel design such as disclosed in U.S. Pat. No. 5,711,888. Separator vessel length can be selected to increase efficiency, and ultrasonic frequencies that produce high quality factor (Q) and/or high Energy Efficiency Factor (EEF) with strong standing waves are preferred in an ultrasonic resonator.

The systems and methods disclosed herein permit processing of large fluid volumes and generally use large acoustically active volumes. As used herein, an acoustically active volume is a volume in which an applied acoustic field has a magnitude suitable for fluid processing. In most practical examples, an acoustically active volume corresponds to a volume of an acoustic resonator defined by acoustic transducer dimensions and a distance between the acoustic transducer and the associated acoustic reflector. Multiple acoustic transducers such as arrays of transducers secured to a substrate can be situated to define a resonator volume with respect to an acoustic reflector. As discussed below, multiple acoustic panels having acoustic transducer arrays can be used, and can be arranged in series, parallel, or a combination thereof. Ultrasonic separators as described herein can have various active acoustic volumes as described below and can process such volumes in simultaneously. In typical examples, a total acoustically active volume (also referred to herein as a total acoustic volume) is at least 100 ml, 1 liter, 2, liters, 5 liters, 10 liters, 100 liters, 200 liters, 500 liters, 1000 liters, 10,000 liters or more. Such volumes are typically processed using multiple acoustic resonators and multiple acoustic panels that can use one or more or an array of transducers. While various acoustic transducer/reflector spacings can be used in acoustic resonators and typical spacings are between 1 cm and 50 cm, 3 cm and 30 cm, 5 cm and 15 cm, 2 cm and 100 cm, 5 cm and 50 cm, 10 cm and 25 cm, and 15 cm and 20 cm. To process practical fluid volumes (typically a few hundred liters), 10, 20, 50, 100, or more acoustic resonators can be used.

With reference to FIG. 1, an ultrasonic separator 100 includes a fluid inlet 102 that couples a fluid to an interior 104 of a suitable fluid container 106. An ultrasonic transducers 108 and an ultrasonic reflector 110 are situated at opposite ends of the container 106 and produce an ultrasonic field 114 (i.e., acoustic standing wave) in a fluid situated in the interior 104 in response to a suitable electrical drive signal from an RF driver 112. A control system 120 is coupled to the RF drive 112 and a flow rate control 122 so as to establish an appropriate RF drive level to the ultrasonic transducer 108 and an appropriate fluid flow rate. Typically, a rate of separation of particles from a fluid increases with increasing RF drive, and decreases with increasing flow rate. An RF drive frequency is generally selected so that the ultrasonic field 114 is a standing wave, and ultrasonic transducer 108 and the ultrasonic reflector 110 define an acoustic resonator so as to increase acoustic field amplitude in the fluid. Particulate aggregates 115 are formed in response to the ultrasonic field 114. Flow rates, electric (or acoustic) powers or amplitudes, and exposure durations are selected by one or more of the controller 120 and the RF drive 112 to obtain a preferred energy per mass removed. Appropriate values can be stored in a memory 130.

Figure 2:
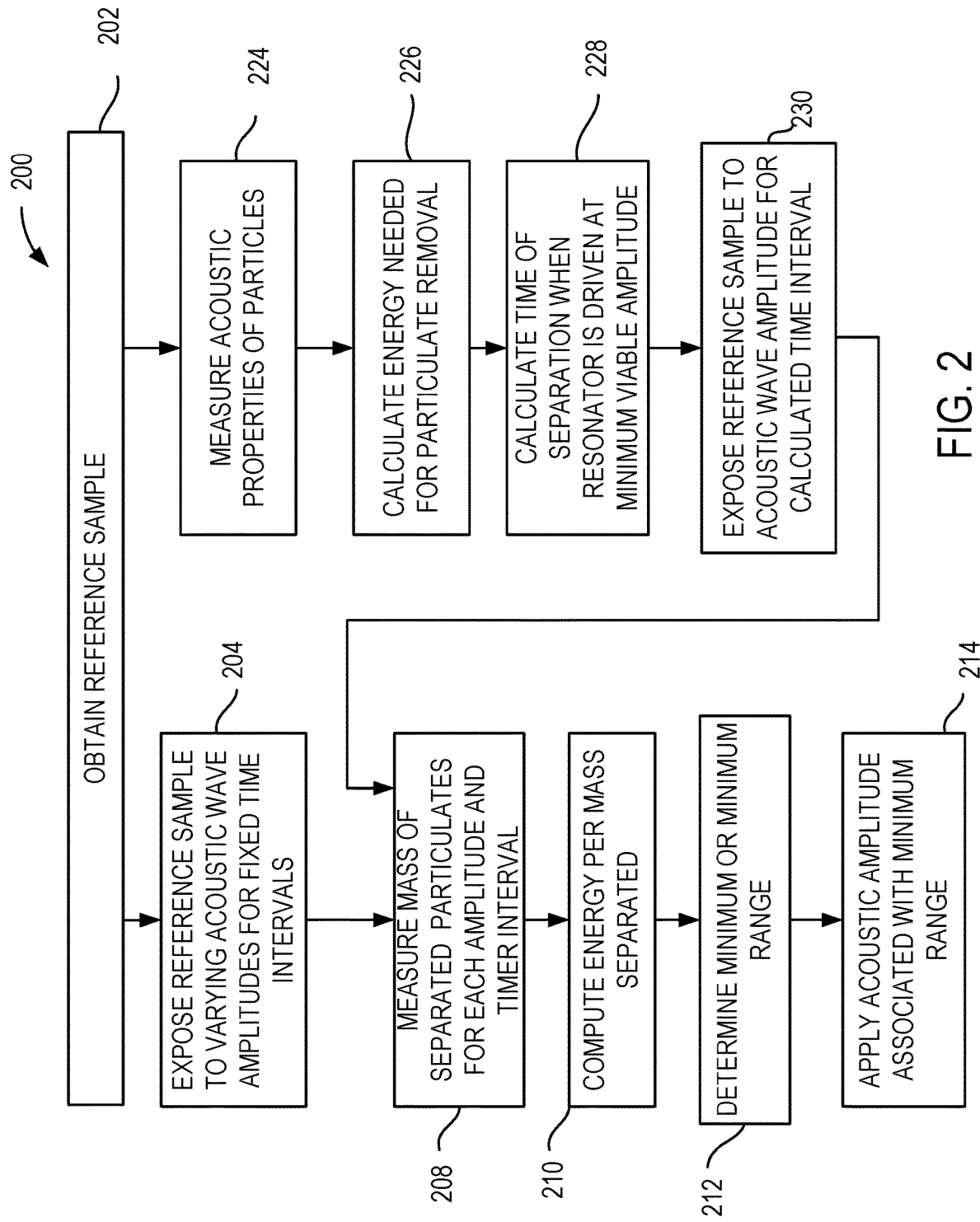
FIG. 2 illustrates a method of determining operating conditions for an ultrasonic separator

A method 200 of ultrasonic separation using an apparatus such as shown in FIG. 1 is illustrated in FIG. 2. At 202, a reference sample such as a sample from a fluid from which particulates are to be removed is obtained, and at 204, the reference sample is exposed to varying acoustic wave amplitudes for one or more durations. At 206, a mass of particles separated for each amplitude at the one or more durations is measured, and at 208, energy per mass separated is determined based on the measured masses. At 212, a range of RF powers is selected that is associated with low or minimum energy per unit mass separated. At 214, a sample with particles to be separated is subjected to an acoustic signal associated with the RF power range. In some examples, a low or minimum energy per unit mass separated is determined based on RF power (i.e., acoustic amplitude) and fluid flow rate or exposure time.

Energy-efficient exposures can also be estimated based on material properties. At 224, acoustic properties of the particles to be separated are measured and at 226, an energy needed for particulate removal is calculated. At 228, a separation time is calculated with a resonator driven at a minimum amplitude. The reference sample is exposed to the acoustic wave at the minimum amplitude for the calculated separation time at 230. Following the exposure at 230, the steps 208, 210, 212, 214 discussed above are performed.

Figure 3:
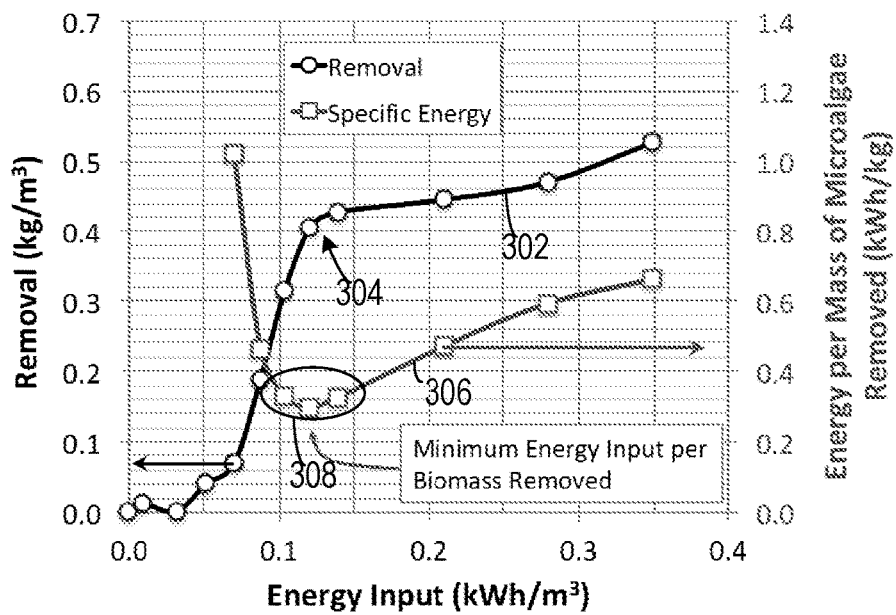
FIG. 3 is a graph illustrating selection of operating conditions for an ultrasonic separator.

FIG. 3 illustrates an example determination of a suitable range of acoustic amplitudes/RF powers to obtain low or minimum energy per mass separated. With no fluid flow or low fluid flow, particulates are separated at various total energy inputs by fixing an exposure time and varying applied RF drive powers, varying exposure times at a fixed applied RF drive power, or by varying both RF drive powers and exposure times. Total applied energy used in each separation is proportional to a product of exposure time and RF drive power. Separated mass per applied energy can be arranged as a function of applied energy as shown by curve 302. Increasing input energy (by increasing RF power or exposure time) generally increases total particulate mass removal, but at region 304, a slope (removed mass per energy) decreases. In some cases, applied power is limited to avoid undesirable degradation of acoustic field strength experienced by particulates due to, for example, a decrease in acoustic resonator Q. For each of the measured separated masses, a ratio of mass to energy can be determined and the ratios of mass to energy can be displayed as a curve 306. As shown in FIG. 3, in a region 308, a minimum energy/unit mass (exposure/mass) is obtained. As used herein, a minimum energy per unit mass region is defined by applied energies that are less than or equal to 1.5, 1.25, 1.2, 1.1, or 1.05 times a minimum energy per unit mass. Such energy ranges and the applied energies in the energy ranges are referred to herein as "energy-efficient."

The data used in generating the graph of FIG. 3 permit selection of preferred total energy exposures (i.e., energy-efficient exposures) to obtain particulate separation. In one example, measured separated mass as a function of energy is used to determine a suitable range. A least-squares or other fit to the measured separated masses per unit energy can be used to identity an energy-efficient region about a minimum energy, and RF power levels or exposure times (or a combination thereof) can be selected. For use in establishing energy-efficient operation by a technician, a graphic representation such as curves 302, 306 in FIG. 3 can be convenient. Alternatively, measured separated mass as a function of energy input can be evaluated to estimate an energy or energy range associated with a decrease in a rate of mass separation per unit energy. Such decreased rates can be identified by a suitable functional fit such as a least squares fit to the measured separated masses, or pointwise slope calculations such as determination of slopes defined by adjacent measurements, alternately spaced measures, averages over several slopes obtained from adjacent measurements, or other slope values and combinations of such slope values.

Figure 4:
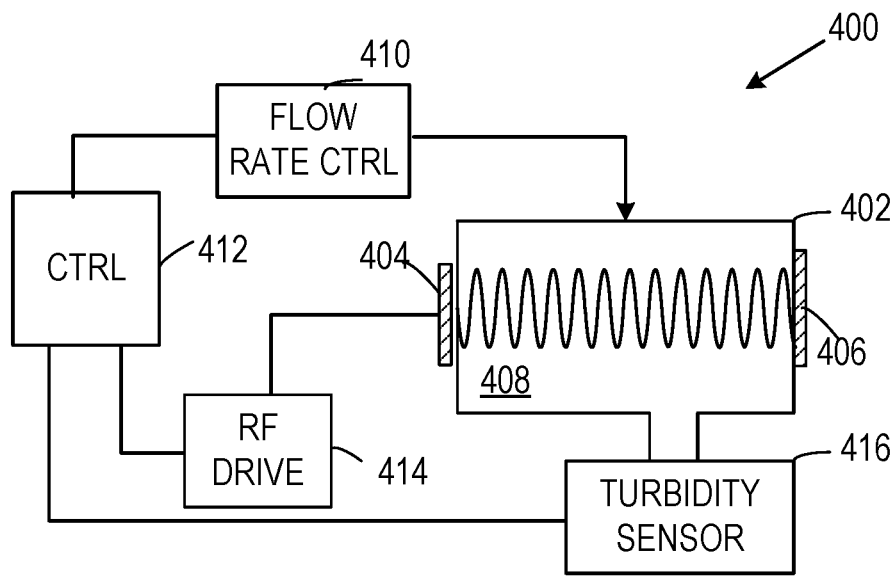
FIG. 4 illustrates a representative ultrasonic separator that includes a control that sets operating conditions.

Referring to FIG. 4, an apparatus 400 includes a sample chamber 402 that is situated between an ultrasonic transducer 404 and an ultrasonic reflector 406 that define an ultrasonic resonator. A particulate-containing sample fluid 408 is situated in the sample chamber 402, and an ultrasonic field is applied with an RF driver 414 that is coupled to the ultrasonic transducer 404. One or more turbidity sensors 416 are coupled to the sample chamber 402, or to one or more outflow ports or outflow lines of the sample chamber 402, so that changes in particulate concentration are estimated. A control system 412 is coupled to the RF driver 414 and a flow rate control 410 (such as a valve or pump) to selected RF power and flow rate. In addition, the controller 412 is coupled to the turbidity sensor 416 so that RF drive power, flow rate, or other operating conditions can be adjusted based on changes in particulate concentration. For example, a rate of change of mass removal as a function of input energy changes at or near a minimum energy condition. Thus, by detecting such a change in mass removal rate via the turbidity sensor 416, the RF drive 412 and the flow rate control 410 can be adjusted to achieve energy-efficient removal. In some examples, particulates are removed from sample batches, and the sample fluid does not flow during removal.

Figure 5:
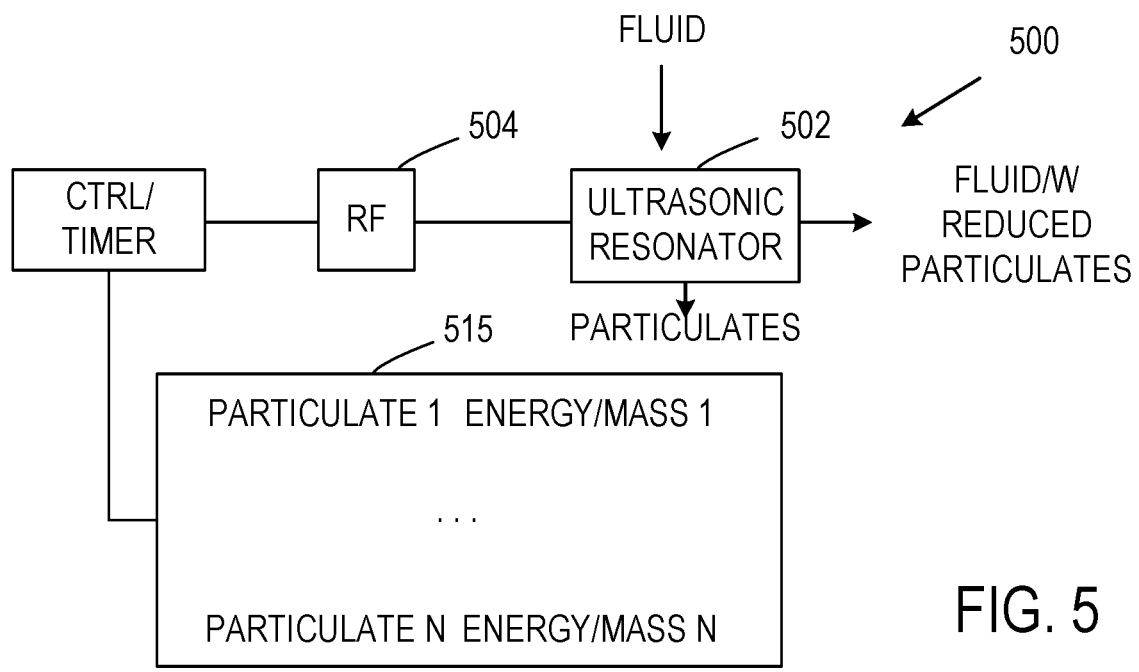
FIG. 5 illustrates a representative ultrasonic separation system.

With reference to FIG. 5, a system 500 for particulate removal includes an ultrasonic resonator 502 that is coupled to a control system and/or timer 504. A memory 515 stores energy-efficient operating conditions (energy/mass) for various particulates that can be found in one or more fluid carriers. Particulates are removed and a fluid with reduced particulate concentration flows out of the ultrasonic resonator 502.

Figure 6:
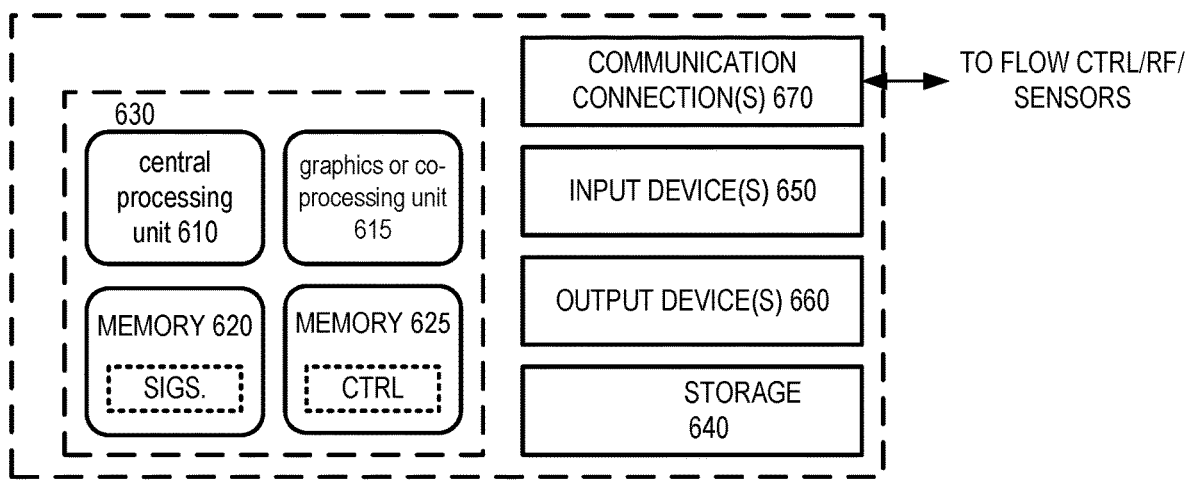
FIG. 6 illustrates a representative control system.

With reference to FIG. 6, controllers for use in ultrasonic separation can include one or more processing units 610, 615 and memory 620, 625. In FIG. 6, this basic configuration 630 is included within a dashed line. The processing units 610, 615 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 6 shows a central processing unit 610 as well as a graphics processing unit or co-processing unit 615. The tangible memory 620, 625 may be volatile memory (e.g., registers, cache, RAM), non-volatile memory (e.g., ROM, EEPROM, flash memory, etc.), or some combination of the two, accessible by the processing unit(s). The memory 620, 625 stores software implementing one or more innovations described herein, in the form of computer-executable instructions suitable for execution by the processing unit(s). For example, control procedures for flow rates, RF power, exposure time, and determination of energy-efficient ranges, and the like can be stored.

A computing system may have additional features. For example, storage 640, one or more input devices 650, one or more output devices 660, and one or more communication connections 670 can be provided. An interconnection mechanism (not shown) such as a bus, controller, or network interconnects components. Typically, operating system software (not shown) provides an operating environment for other software.

The tangible storage 640 may be removable or non-removable, and includes magnetic disks, magnetic tapes or cassettes, CD-ROMs, DVDs, or any other medium which can be used to store information in a non-transitory way and which can be accessed. The storage 640 stores instructions for implementing one or more innovations described herein.

The input device(s) 650 may be a touch input device such as a keyboard, mouse, pen, or trackball, a voice input device, a scanning device, or another device that provides input to the computing environment 600. The output device(s) 660 may be a display, printer, speaker, CD-writer, or another device that provides output from the computing environment 600.

The communication connection(s) 670 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves.

Figure 7A:
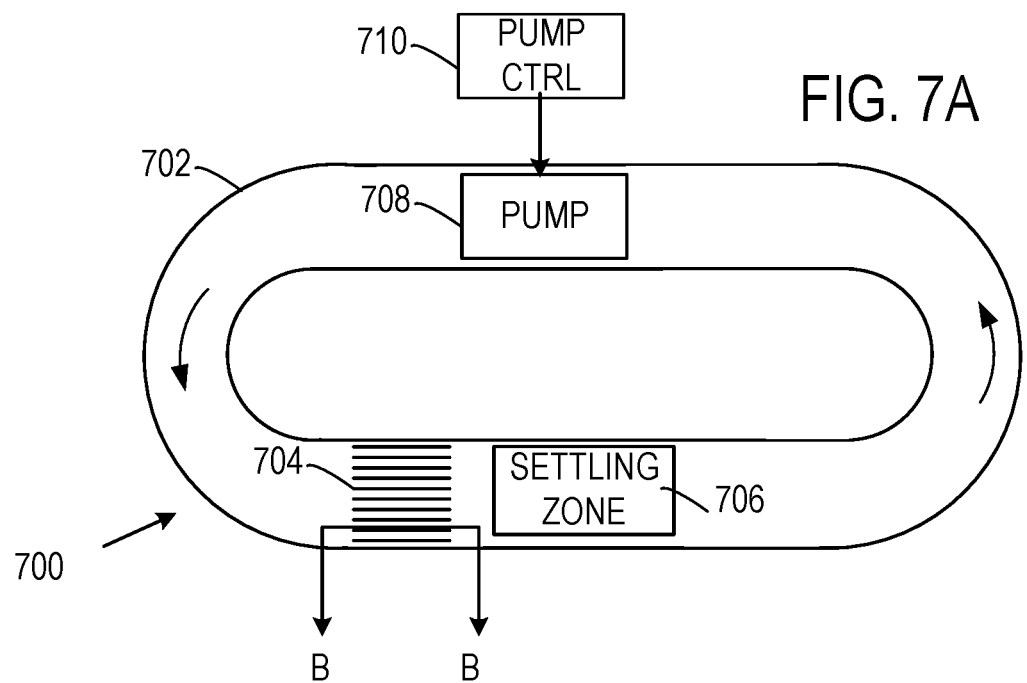
FIG. 7A illustrates a representative ultrasonic separation system that includes a plurality of parallel acoustic panels.
Figure 7B:
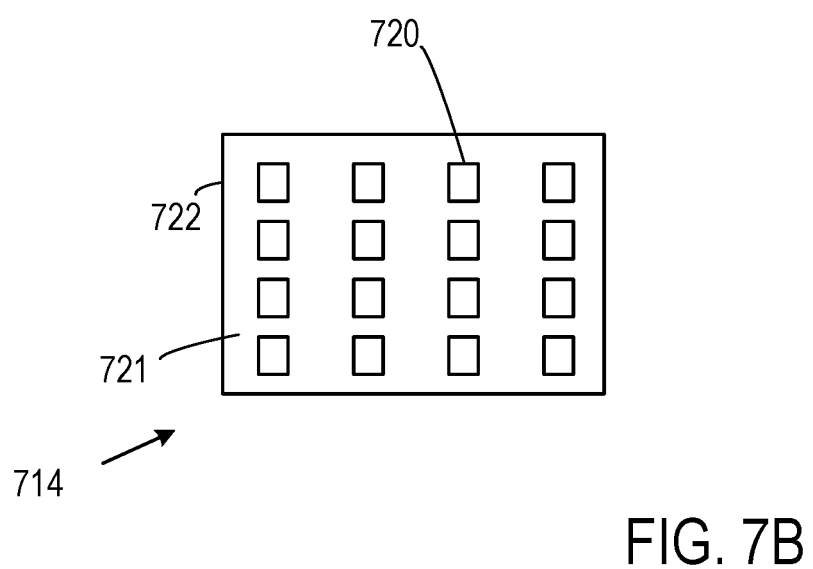
FIG. 7B illustrates a representative acoustic panel as used in the system of FIG. 7A.

With reference to FIGS. 7A-7B, a representative separation system 700 includes a fluid chamber 702 having a racetrack shaped cross section and a set 704 of acoustic panels such as panel 714. A pump 708 is situated to produce a fluid flow, either a continuous or intermittent flow, through the set 704 of acoustic panels to separate material in a fluid and accumulate the separated material in a settling zone 706 which can be situated downstream of or vertically below the set 704. In some examples, fluid flow is intermittent and particulates from a sample at the set 704 are collected and then a new sample is directed to the set 704 by the pump 708. In other examples, the pump 708 produces a continuous flow. As shown in FIG. 7B, the panel 714 typically includes a set of ultrasonic transducers such as transducer 720 secured to a major surface 721 substrate 722. The transducers can be arranged in a rectangular array, and the substrate 722 can serve as an acoustic reflector. The transducers are generated driven by an acoustic driver or other signal generator at or near a resonance frequency at or near a resonance frequency determined by panel spacing and acoustic properties of the panels and the sample fluid.

In another example illustrated in FIG. 8, an apparatus 800 includes vertically stacked sets 804-806 of acoustic panels that include respective sets or arrays of ultrasonic transducers such as representative transducer 812. The stacked sets 804-806 are situated above a collector 816 and are coupled to an acoustic driver 818. A sequence in which the sets 804-806 are energized is determined by a sequencer 820 that is coupled to the acoustic driver. While all sets can be activated simultaneously, in some examples, sets are activated sequentially. For example, an upper set (such as the set 804) is energized to allow particulates exposed to acoustic waves to aggregate and start settling toward a lower set such as the set 805 which is then activated. Sequence timing can be varied based on fluid and/or particulate properties. In some cases, computer-executable instructions can establish a user interface for entry of sequence characteristics such as activation durations for each set, delays between activations of each set, and activation amplitudes. Each set can be associated with an energy-efficient or other exposure.

As shown in FIG. 8, sets of transducer panels are arranged vertically so that accumulations of particulates settle downwards, and fluid can be arranged to be still or flow. In other examples, panels are arranged in series along a flow direction established by a pump and a fluid container. In still other examples, panels are arranged both vertically and along a flow direction. While sets of acoustic transducers can be particularly useful, one or more individual transducers can be used, especially if small volumes of fluid are to be processed. It is convenient to have all panels be of a common configuration so that as stacked, panel edges are aligned in common planes.

Figure 9:
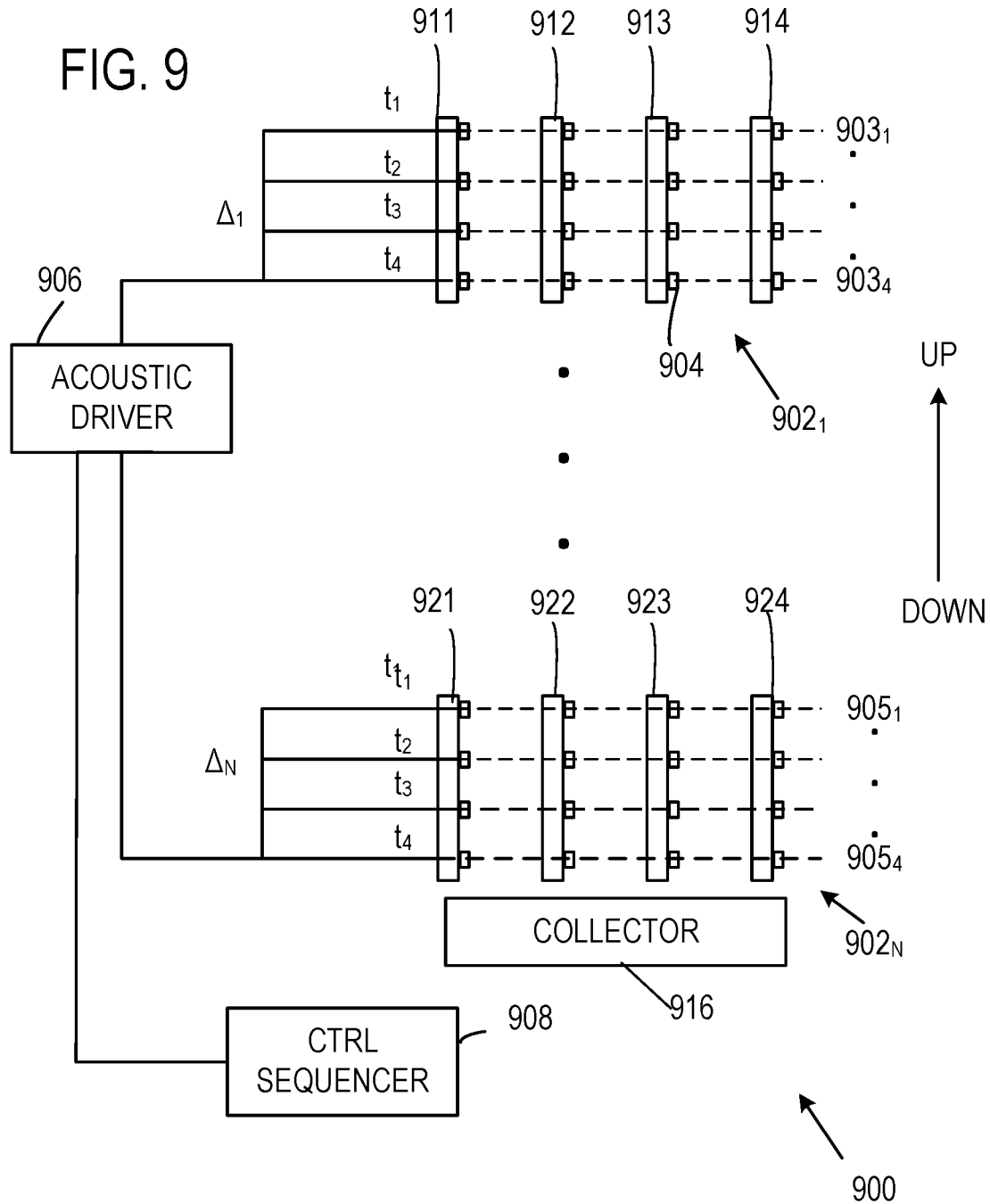
FIG. 9 illustrates a representative ultrasonic separation system that includes a vertically stacked acoustic panel in which rows of acoustic transducers are activated sequentially from top to bottom.

With reference to FIG. 9, a separation system 900 comprising vertically stacked sets $902_1, \ldots, 902_N$ of acoustic panels. Each of the panels comprises an array or other set of acoustic transducers. For example, the sets $902_1, \ldots, 902_N$ comprise panels 911-914 and 921-924, respectively, each including acoustic transducers such as representative acoustic transducer 904. The acoustic transducers of each of the sets $902_1, \ldots, 902_N$ of acoustic panels are coupled to an acoustic driver 906 which activates the transducers in a temporal sequence determined by a control sequencer 908. As shown, rows $903_1$, $903_4$ of transducers of the acoustic panel $902_1$ are activated with respective times or time delays $t_1$, $t_2$, $t_3$, $t_4$, with a panel temporal delay $\Delta_1$. Similarly, rows $905_1, \ldots, 905_4$ of transducers of the acoustic panel $902_N$ are activated with respective times or time delays $t_1$, $t_2$, $t_3$, $t_4$, with a panel temporal delay $\Delta_N$.

Figure 10:
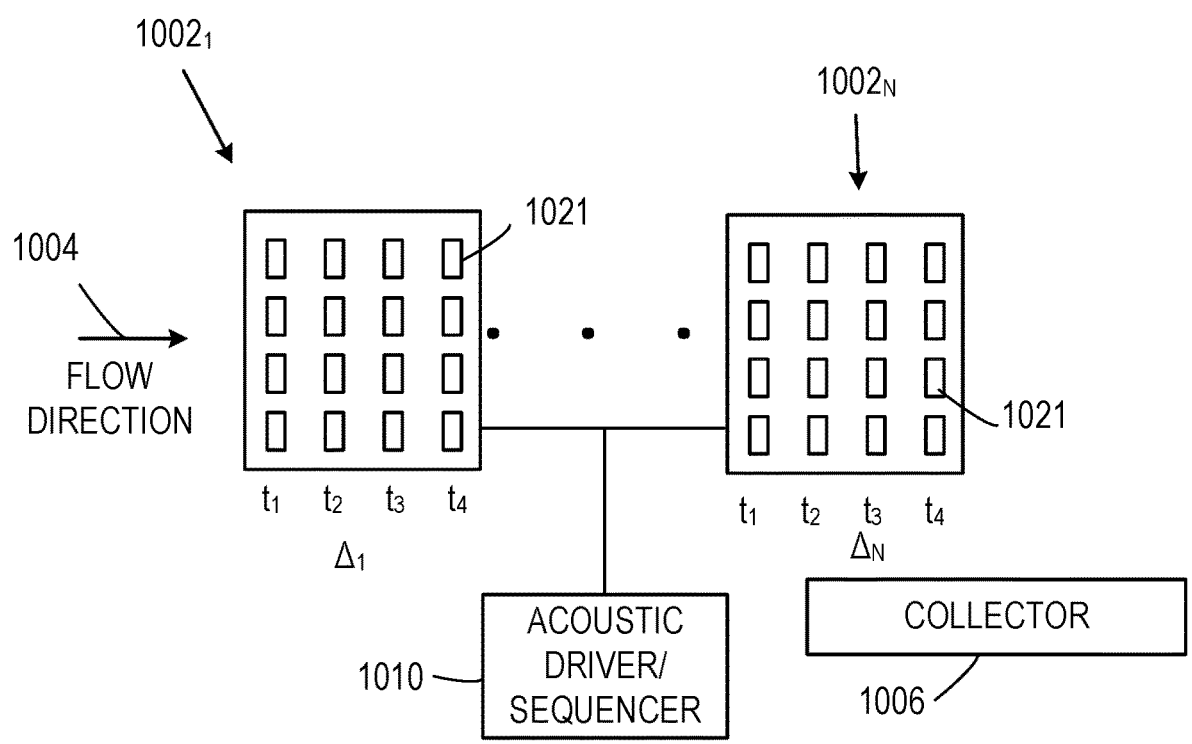
FIG. 10 illustrates a representative ultrasonic separation system that includes a vertically stacked acoustic panel in which rows of acoustic transducers are activated sequentially from top to bottom.

As shown in FIG. 10, acoustic panels $1002_1, \ldots, 1002_N$ are arranged along a flow direction 1004. Each of the acoustic panels includes a plurality of transducers arranged in an array having rows and columns, with columns along an axis that is perpendicular to the flow direction 1004. An acoustic driver/sequencer 1010 is coupled to the transducers (such as representative transducers 1021) of the acoustic panels $1002_1, \ldots, 1002_N$ to selectively activate individual transducers of some or all acoustic panels. Transducers can be individually selected on some or all panels, or rows, columns, diagonals, or other arrangements of transducers can be selected. Transducers on a selected acoustic panel can be activated simultaneously or in sequence with transducers on a different acoustic panel. A collections zone 1006 can be situated downstream of the acoustic panels or along the acoustic panels, as preferred.

As shown in FIG. 10, each column of transducers is assigned an activation time or time delay $t_1$, $t_2$, $t_3$, $t_4$, and an $i^{th}$ acoustic panel can have a temporal offset $\Delta_i$. The time delays and temporal offsets can be the same or different. In one example, the acoustic driver/sequencer 1010 activates the transducers column by column starting with a most upstream column of a most upstream acoustic panel and ending with a most downstream column of a most downstream acoustic panel. Transducers can also be activated based on flow velocities so that different acoustic signals are applied to slower moving flows and faster moving flows so that total acoustic energy applied is associated with a flow rate and an acoustic power. While in many examples, each transducer is activated at a common power, transducers can be activated at different power levels. Exposures by some or all transducers can be arranged to be energy-efficient exposures as discussed above. In some cases, some transducers such as rows, columns, or all transducers on a single panel can be coupled in series or parallel to the acoustic driver/sequencer 1010, and the acoustic driver/sequencer 1010 activates the transducers at acoustic resonance frequencies to enhance acoustic field strength. As discussed above, processing systems for large fluid volumes can use many such panels, and the examples of FIGS. 7A-10 show only a few panels for purposes of illustration.

In view of the many possible embodiments to which the principles of the disclosed technology may be applied, it should be recognized that the illustrated embodiments are only preferred examples and should not be taken as limiting the scope of the disclosure. We claim as our invention all that comes within the scope and spirit of the appended claims.

We claim:

1. An ultrasonic separation method, comprising:
measuring at least a reference portion containing particulates in a fluid to determine an energy-efficient ultrasonic exposure for use in separation of particulates from the fluid; and
processing at least a sample portion containing particulates in a fluid according to the energy-efficient ultrasonic exposure so as to separate a portion of particulates from the sample portion.

2. The ultrasonic separation method of claim 1, further comprising:
selecting an ultrasonic exposure duration;
based on the selected ultrasonic exposure duration and the energy-efficient exposure, selecting an ultrasonic power, wherein the processing sample portion containing particulates in the fluid according to the energy-efficient ultrasonic exposure corresponds to applying the selected ultrasonic power for the selected ultrasonic exposure duration.

3. The ultrasonic separation method of claim 2, wherein selecting the ultrasonic power corresponds to selecting an electrical drive power to an ultrasonic transducer.

4. The ultrasonic separation method of claim 2, wherein selecting the ultrasonic power corresponds to selecting an electrical drive voltage and the selected ultrasonic power is applied based on driving an acoustic transducer with the selected electrical drive voltage.

5. The ultrasonic separation method of claim 1, wherein the energy-efficient exposure is determined based on a change in a rate of particulate mass removal as a function of exposure.

6. The ultrasonic separation method of claim 1, wherein the energy-efficient exposure is determined based on a decrease in a rate of change of particulate mass removal as a function of exposure.

7. The ultrasonic separation method of claim 6, wherein the energy-efficient exposure is a determined based on a decrease of a rate of change of particulate mass removal as a function of exposure of at least of at least 20% with respect to a maximum rate of change.

8. The ultrasonic separation method of claim 1, wherein the energy-efficient exposure is selected from an energy-efficient range associated with an estimated minimum energy per unit mass for particulate removal.

9. The ultrasonic separation method of claim 8, wherein the energy-efficient range is defined by exposures within ±10% of a minimum energy exposure.

10. The ultrasonic separation method of claim 1, wherein the energy-efficient exposure corresponds to an estimated minimum energy per unit mass for particulate removal.

11. The ultrasonic separation method of claim 1, wherein the measuring a reference portion containing particulates in the fluid to determine the energy-efficient ultrasonic exposure comprises:
exposing the reference sample to an ultrasonic field at a selected ultrasonic power;
measuring particulate separations at a plurality of times during the exposing; and
determining the energy-efficient ultrasonic exposure based on the measured particulate separations and the plurality of times.

12. The ultrasonic separation method of claim 1, further comprising obtaining the reference portion and the sample portion from a common sample.

13. The ultrasonic separation method of claim 1, further comprising extracting the separated articles.

14. An ultrasonic separator, comprising:
a sample container;
an ultrasonic generator situated to couple an ultrasonic field having a selected power to the sample container for a selected duration; and
an ultrasonic generator controller coupled to the ultrasonic generator to establish the selected power and the selected duration and provide an energy-efficient exposure to a particulate containing fluid situated in the sample container to extract particulates from the fluid in the sample container.

15. The ultrasonic separator of claim 14, further comprising a memory device coupled to the ultrasonic generator controller, the memory device storing at least one energy-efficient exposure range or energy-efficient exposure associated with particulate extraction from the fluid.

16. The ultrasonic separator of claim 14, wherein the ultrasonic generator and the sample container are configured to define an ultrasonic resonator so as to increase an ultrasonic field amplitude in the sample container.

17. The ultrasonic separator of claim 14, further comprising a turbidity sensor coupled to the sample container and the ultrasonic generator controller, the turbidity sensor situated to determine a particulate concentration in a sample in the sample container, wherein the ultrasonic generator controller is coupled to adjust at least one of an RF drive power, a flow rate, or an exposure time based on at least one indicator of particulate concentration.

18. The ultrasonic separator of claim 17, wherein the ultrasonic generator controller is coupled to adjust at least one of an RF drive power, a flow rate, or an exposure time based on a rate of change of particulate concentration.

19. The ultrasonic separator of claim 18, wherein the ultrasonic generator controller is coupled to halt exposure based on a change in rate of change of a particulate concentration.

20. The ultrasonic separator of claim 18, wherein the particulate concentration is in mass per volume.

21. An ultrasonic separation method, comprising:
exposing a first portion of a sample containing particulates in a fluid to an ultrasonic field to determine an energy-efficient ultrasonic exposure for use in separation of particulates from the fluid; and
exposing a second portion of the sample to an ultrasonic field according to the energy-efficient ultrasonic exposure so as to separate a portion of the particulates from the second portion of the sample.

* * * * *